(12) United States Patent
Doshi et al.

(10) Patent No.: US 10,417,218 B2
(45) Date of Patent: Sep. 17, 2019

(54) TECHNIQUES TO ACHIEVE ORDERING AMONG STORAGE DEVICE TRANSACTIONS

(71) Applicant: INTEL CORPORATION, Santa Clara, CA (US)

(72) Inventors: Kshitij A. Doshi, Chandler, AZ (US); Sanjeev N. Trika, Portland, OR (US); Sridharan Sakthivelu, Dupont, WA (US)

(73) Assignee: INTEL CORPORATION, Santa Clara, CA (US)

( * ) Notice: Subject to any disclaimer, the term of this patent is extended or adjusted under 35 U.S.C. 154(b) by 379 days.

(21) Appl. No.: 14/757,602

(22) Filed: Dec. 23, 2015

(65) Prior Publication Data

US 2017/0185643 A1 Jun. 29, 2017

(51) Int. Cl.
*G06F 16/23* (2019.01)
*G06F 9/46* (2006.01)

(52) U.S. Cl.
CPC .......... *G06F 16/2379* (2019.01); *G06F 9/466* (2013.01)

(58) Field of Classification Search
CPC ........ G06F 17/30377; G06F 17/30368; G06F 17/30156; G06F 17/30575; G06F 17/30191; G06F 17/30289; G06F 17/30356; G06F 11/1451; G06F 11/1471; G06F 11/1466; G06F 11/2082; G06F 11/1474; G06F 3/0619; G06F 3/065; G06F 3/061; G06F 12/0246; G06F 16/2379; G06F 9/466

USPC ......................................................... 707/703
See application file for complete search history.

(56) References Cited

U.S. PATENT DOCUMENTS

| | | | |
|---|---|---|---|
| 6,311,179 B1 | 10/2001 | Agarwal et al. | |
| 6,543,006 B1* | 4/2003 | Zundel | G06F 11/141 714/15 |
| 6,618,851 B1* | 9/2003 | Zundel | G06F 17/50 711/156 |
| 8,977,898 B1 | 3/2015 | Veeraswamy et al. | |
| 9,170,938 B1* | 10/2015 | Walsh | G06F 12/0246 |
| 2002/0133670 A1* | 9/2002 | Rust | G06F 3/0619 711/114 |
| 2003/0225760 A1* | 12/2003 | Ruuth | G06F 11/1471 |
| 2007/0083491 A1* | 4/2007 | Walmsley | G06F 21/608 |
| 2008/0183686 A1 | 7/2008 | Bhattacharyya et al. | |
| 2010/0023682 A1* | 1/2010 | Lee | G06F 12/0246 711/103 |
| 2010/0223656 A1 | 9/2010 | Ray et al. | |
| 2010/0250572 A1* | 9/2010 | Chen | G06F 17/3051 707/759 |

(Continued)

OTHER PUBLICATIONS

International Search Report and Written Opinion received for PCT Patent Application No. PCT/US2016/063690, dated Mar. 13, 2017, 13 pages.

(Continued)

*Primary Examiner* — Jay A Morrison
*Assistant Examiner* — Antonio J Caiado

(57) ABSTRACT

Various embodiments are generally directed to an apparatus, method and other techniques to receiving a sequence of transactions, each transaction including a request to write data to a memory device, processing the sequence of transactions, and communicating a response to a host after the sequence of transaction have been completed.

19 Claims, 11 Drawing Sheets

(56) References Cited

U.S. PATENT DOCUMENTS

| | | | |
|---|---|---|---|
| 2010/0317420 A1* | 12/2010 | Hoffberg | G06Q 30/0207 463/1 |
| 2011/0122691 A1* | 5/2011 | Sprouse | G06F 1/28 365/185.03 |
| 2012/0166795 A1 | 6/2012 | Wood et al. | |
| 2012/0260345 A1 | 10/2012 | Quinn et al. | |
| 2012/0324472 A1 | 12/2012 | Rossbach et al. | |
| 2014/0245013 A1* | 8/2014 | Kim | H04L 67/34 713/171 |
| 2015/0095578 A1* | 4/2015 | Doshi | G06F 12/0888 711/125 |
| 2015/0199290 A1 | 7/2015 | Mathewson et al. | |
| 2015/0263855 A1 | 9/2015 | Schulz | |
| 2015/0269215 A1* | 9/2015 | Lehouillier | G06F 17/30368 707/626 |
| 2015/0277969 A1* | 10/2015 | Strauss | G06F 9/466 707/703 |
| 2015/0347768 A1 | 12/2015 | Martin et al. | |
| 2016/0070740 A1* | 3/2016 | Vermeulen | G06F 17/30545 707/703 |
| 2016/0170833 A1* | 6/2016 | Segura | G06F 11/1088 714/6.23 |
| 2016/0179876 A1* | 6/2016 | Jimenez Peris | G06F 17/30353 707/703 |
| 2016/0342351 A1* | 11/2016 | Li | G06F 11/1471 |

OTHER PUBLICATIONS

International Search Report for the International Patent Application No. PCT/US2016/063682, dated Mar. 13, 2017.

\* cited by examiner

Storage Device Table 470

404 – Ack (T1)
408 – Ack (T2)
412 – Ack (T3)
424 – Commit_Complete (T2)
426 – Commit_Complete (T1)
430 – Commit_Complete (T3)

Host Computing Platform Table 460

402 – T1 = MultiBlk_Txn (3)
406 – T2 = MultiBlk_Txn (4)
410 – T3 = CreateDT({T1, T2}, 1)
414-1 – AsyncWrite (T1, $LBA_{T1,1}$, $len_{T1,1}$, $data_{T1,1}$)
414-2 – AsyncWrite (T1, $LBA_{T1,2}$, $len_{T1,2}$, $data_{T1,2}$)
414-3 – AsyncWrite (T1, $LBA_{T1,3}$, $len_{T1,3}$, $data_{T1,3}$)
416 – Commit (T1)
418-1 – AsyncWrite (T2, $LBA_{T2,1}$, $len_{T2,1}$, $data_{T2,1}$)
418-2 – AsyncWrite (T2, $LBA_{T2,2}$, $len_{T2,2}$, $data_{T2,2}$)
418-3 – AsyncWrite (T2, $LBA_{T2,3}$, $len_{T2,3}$, $data_{T2,3}$)
418-4 – AsyncWrite (T2, $LBA_{T2,4}$, $len_{T2,4}$, $data_{T2,4}$)
420 – Commit (T2)
422 – AsyncWrite (T3, $LBA_{T3,1}$, $len_{T3,1}$, $data_{T3,1}$)
426 – Commit (T3)

*Storage Medium 700*

*Computer Executable Instructions for 500 and 600*

*FIG. 7*

TECHNIQUES TO ACHIEVE ORDERING AMONG STORAGE DEVICE TRANSACTIONS

TECHNICAL FIELD

Embodiments described herein generally relate to techniques to process transactions to write data to storage devices.

BACKGROUND

File-systems, databases, object-systems, and many other key applications frequently issue a transaction to non-volatile memory, and must ensure that the transaction completes before issuing the next transaction, e.g., data for the transaction is usually written into blocks in the block-based non-volatile storage device before updating the file mapping table in storage to point to those set of blocks. As another example, database systems typically write metadata/journal-entries specifying the intent of the next write, then the data itself, followed by additional metadata specifying completion, as part of a database update request—this is a sequence of 3 dependent transactions.

BRIEF DESCRIPTION OF THE DRAWINGS

FIG. 4B illustrates an example table diagram.
FIG. 7 illustrates an example storage medium.

DETAILED DESCRIPTION

Figure 1:
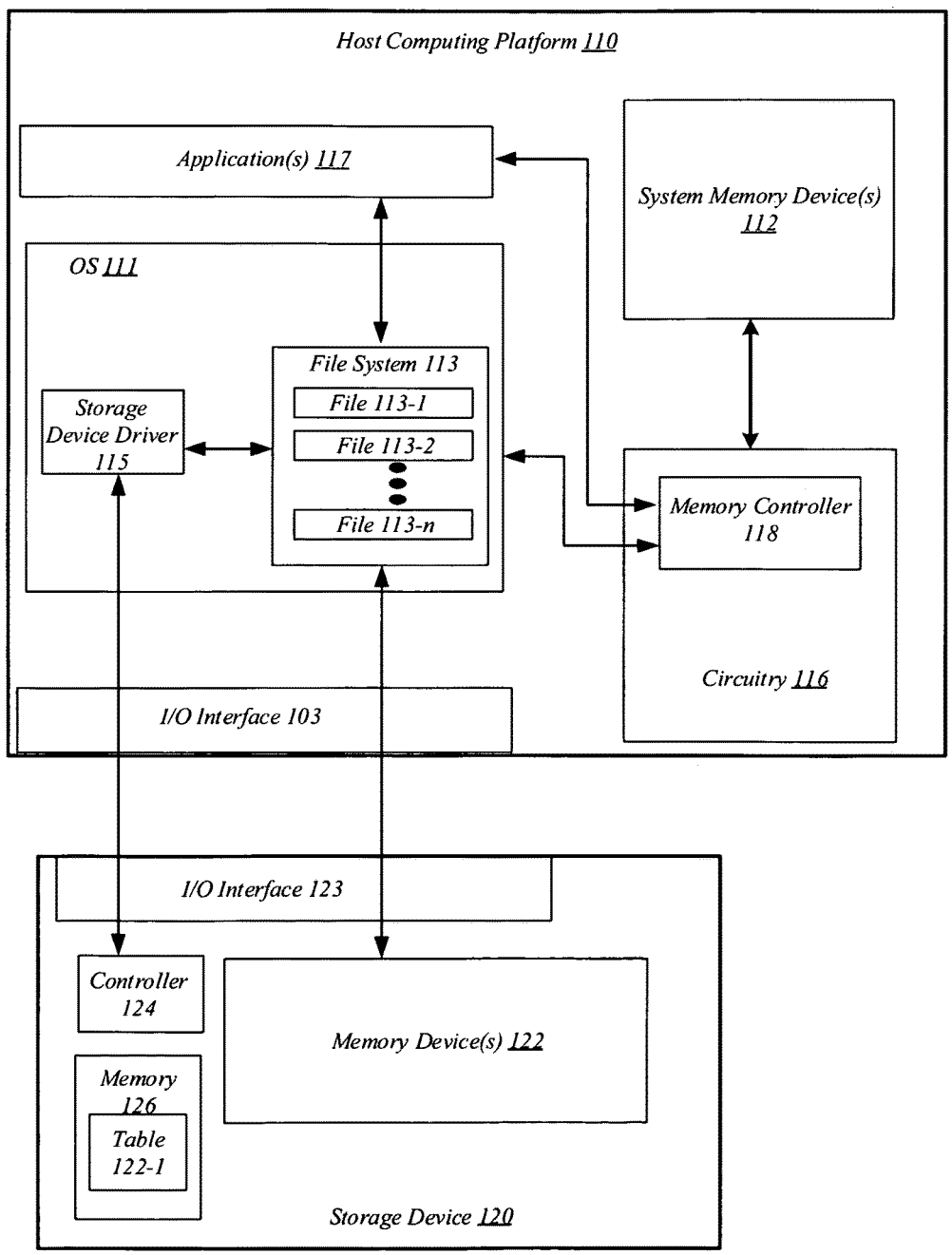
FIG. 1 illustrates an example first system.

Various embodiments are directed to systems, devices, methods and techniques to process transactions, whose effect is to store data persistently. More specifically, embodiments include a scheme in which a sequence of transactions, including their dependency information, is specified by a host computing platform to a storage device. The host computing platform is freed to issue operations without sending data out of host memory, without waiting for completion of previous store operations, or without initiation of a flush operation on the storage device, thereby improving performance and reducing complexity. Typically a flush command is communicated between each transaction by the host computing platform which waits for the flush to complete, e.g. receives information indicating completion of the flush operation. This is slow for the system, and can also hurt storage performance depending on how the flush-handling is internally implemented. Thus, embodiments are directed to solving these and other problems.

For example, the host device specifying the sequence of transactions including their dependency information ensures that a dependent transaction does not logically start until its dependencies, e.g. pre-requisite transactions, are logically complete. It also opens the option to internally optimize the multiple queued operations. In one example scenario where there is a flush command between 4 dependent transactions, and one write per transaction, the effective queue-depth (QD) on a storage device increases from 1 to 4. In this scenario, the input/output operations per second (IOPS) increases 287% even without including the cost of issuing the flush command and completion. If the dependent chain is even larger, the performance gains increase.

In another example scenario where a file-system currently does six (6) file writes followed by a flush, followed by single file-system update, the effective QD increases from 6 to 7, resulting in a net 6% write-performance gains.

In embodiments, a host computing platform issues one or more transactions including at least one dependent transaction having pre-requisite transaction(s) or transaction(s) to be committed prior to dependent transaction. A storage device receives the one or more transactions including the dependent transaction and generates a directed-acyclic-graph (DAG) structure representing the described dependencies. A DAG structure includes nodes corresponding with transactions and edges corresponding with dependencies. The DAG structure may be used by a controller in the storage device to determine whether a transaction may be committed or not. More specifically, the controller may commit transactions that have no existing pre-requisite transactions that need to be committed based on the DAG structure. The controller may withhold committing transactions that have existing pre-requisite transactions until the pre-requisite transaction are committed. These and other details will become apparent in the following description.

Various embodiments also relate to an apparatus or systems for performing these operations. This apparatus may be specially constructed for the purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the method. The structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example system 100. In some examples, as shown in FIG. 1, system 100 includes a host computing platform 110 coupled to a storage device 120 through input/output (I/O) interface 103 and I/O interface 123. Also, as shown in FIG. 1, host computing platform 110 may include an operating system (OS) 111, one or more system memory device(s) 112, circuitry 116 and one or more application(s) 117. For these examples, circuitry 116 may be capable of executing various functional elements of host computing platform 110 such as OS 111 and application(s) 117 that may be maintained, at least in part, within system memory device(s) 112. Circuitry 116 may include host processing circuitry to include one or more central processing units (CPUs) and associated chipsets and/or controllers.

According to some examples, as shown in FIG. 1, OS 111 may include a file system 113 and a storage device driver 115 and storage device 120 may include a controller 124, one or more memory device(s) 122 and memory 126. OS 111 may be arranged to implement storage device driver 115 to coordinate at least temporary storage of data for a file from among files 113-1 to 113-$n$, where "n" is any whole positive integer>1, to memory device(s) 122. The data, for example, may have originated from or may be associated with executing at least portions of application(s) 117 and/or OS 111. As described in more detail below, the OS 111 communicates one or more commands and transactions with the storage device 120 to write data to the storage device 120. The commands and transactions can be organized and processed by the storage device 120, and specifically controller 124, in an order to satisfy any dependency requirements. For example, the controller 124 may generate a data structure, such as a DAG structure, for each transaction to capture transactions and their dependencies, as will be discussed in more detail below. Each of the DAGs may be stored in a buffer in memory 126 to process the transactions, for example. In embodiments, memory 126 may be volatile memory including, but not limited to random-access memory (RAM), Dynamic RAM (D-RAM), double data rate synchronous dynamic RAM (DDR SDRAM), static random-access memory (SRAM), Thyristor RAM (T-RAM), zero-capacitor RAM (Z-RAM), and so forth. However, embodiments are not limited in this manner, and in some instances, memory 126 may be non-volatile memory. Further, the controller 124 may include circuitry, a processing circuit, firmware, logic, embedded logic, or a combination thereof. Further, the controller 124 may be software only, hardware only, or a combination of software or hardware. Embodiments are not limited in this manner.

In some examples, memory device(s) 122 may be a device to store data from transactions and may be associated with a table 122-1 to store a file-mapping of the data. In some embodiments, the table 122-1 may be stored in memory 126. In embodiments, the memory device(s) 122 includes one or more chips or dies having gates that may individually include one or more types of non-volatile memory to include, but not limited to, NAND flash memory, NOR flash memory, three dimensional (3-D) cross-point memory, ferroelectric memory, silicon-oxide-nitride-oxide-silicon (SONOS) memory, polymer memory such as ferroelectric polymer memory, ferroelectric transistor random access memory (FeTRAM) or FeRAM), ovonic memory, nanowire magnetoresistive random-access (MRAM) that incorporates memristor technology, or spin transfer torque (STT)-MRAM, phase change memory, or electrically erasable programmable read-only memory (EEPROM). For these examples, storage device 120 may be arranged or configured as a solid-state drive (SSD).

Examples are not limited to storage devices arranged or configured as SSDs other storage devices such as a hard disk drive (HDD) are contemplated. In these instances, the memory device (s) 122 may include one or more platters or rotating disks having a magnet material to store the data. The data may be read and written in blocks and a mapping or location information for the blocks may be kept in table 122-1.

According to some examples, communications between storage device driver 115 and controller 124 for data stored in memory devices(s) 122 and accessed via files 113-1 to 113-$n$ may be routed through I/O interface 103 and I/O interface 123. The I/O interfaces 103 and 123 may be arranged as a Serial Advanced Technology Attachment (SATA) interface to couple elements of host computing platform 110 to storage device 120. In another example, the I/O interfaces 103 and 123 may be arranged as a Serial Attached Small Computer System Interface (SCSI) (or simply SAS) interface to couple elements of host computing platform 110 to storage device 120. In another example, the I/O interfaces 103 and 123 may be arranged as a Peripheral Component Interconnect Express (PCIe) interface to couple elements of host computing platform 110 to storage device 120. In another example, I/O interfaces 103 and 123 may be arranged as a Non-Volatile Memory Express (NVMe) interface to couple elements of host computing platform 110 to storage device 120.

In some examples, system memory device(s) 112 may store information and commands which may be used by circuitry 116 for processing information. Also, as shown in FIG. 1, circuitry 116 may include a memory controller. 118. Memory controller 118 may be arranged to control access to data at least temporarily stored at system memory device(s) 112.

The memory controller 118 may include logic and/or features to process data and information for temporary storage in system memory device(s) 112 including instructions and commands issued by application(s) 117 and the operating system 111. For example, the memory controller 118 may cause temporary variables or other intermediate information to be stored in memory devices 112 while processing circuitry is executing instructions. In some embodiments, the memory controller 118 may load information and data information from system memory device(s) 112 into the computing registers during processing of instructions by processing circuitry. Manipulated data is then often stored back in the system memory device(s) 112 by the memory controller 118, either by the same instruction or a subsequent one. The memory controller 118 is not limited to processing and storing the above discussed data and information; the memory controller 118 may process and store any type of data.

In some instances, the memory controller 118 and/or other processing circuitry may control the communication of the commands and transactions such that a number of transactions may be sent, via the storage device driver 115, to the storage device 120 without issuing page flush commands from the host. More specifically, the memory controller 118 can enable communication of the transactions and instructions including whether any dependencies exist for each of the transactions from the computing platform 110 to the storage device 120. Thus, coordination of dependent transactions can be handled and processed by the storage device 120 causing an increase of queue-depth, e.g. the number of commands in queue to write data on the storage device 120.

System Memory device(s) 112 may include one or more chips or dies having volatile types of memory such as dynamic random access memory (DRAM) or non-volatile types of memory such as 3-D cross-point memory, NOR flash memory, ferroelectric memory, silicon-oxide-nitride-oxide-silicon (SONOS) memory, polymer memory such as ferroelectric polymer memory, ferroelectric transistor random access memory (FeTRAM) or FeRAM), ovonic memory, nanowire or electrically erasable programmable read-only memory (EEPROM).

According to some examples, host computing platform 110 may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

Figure 2:
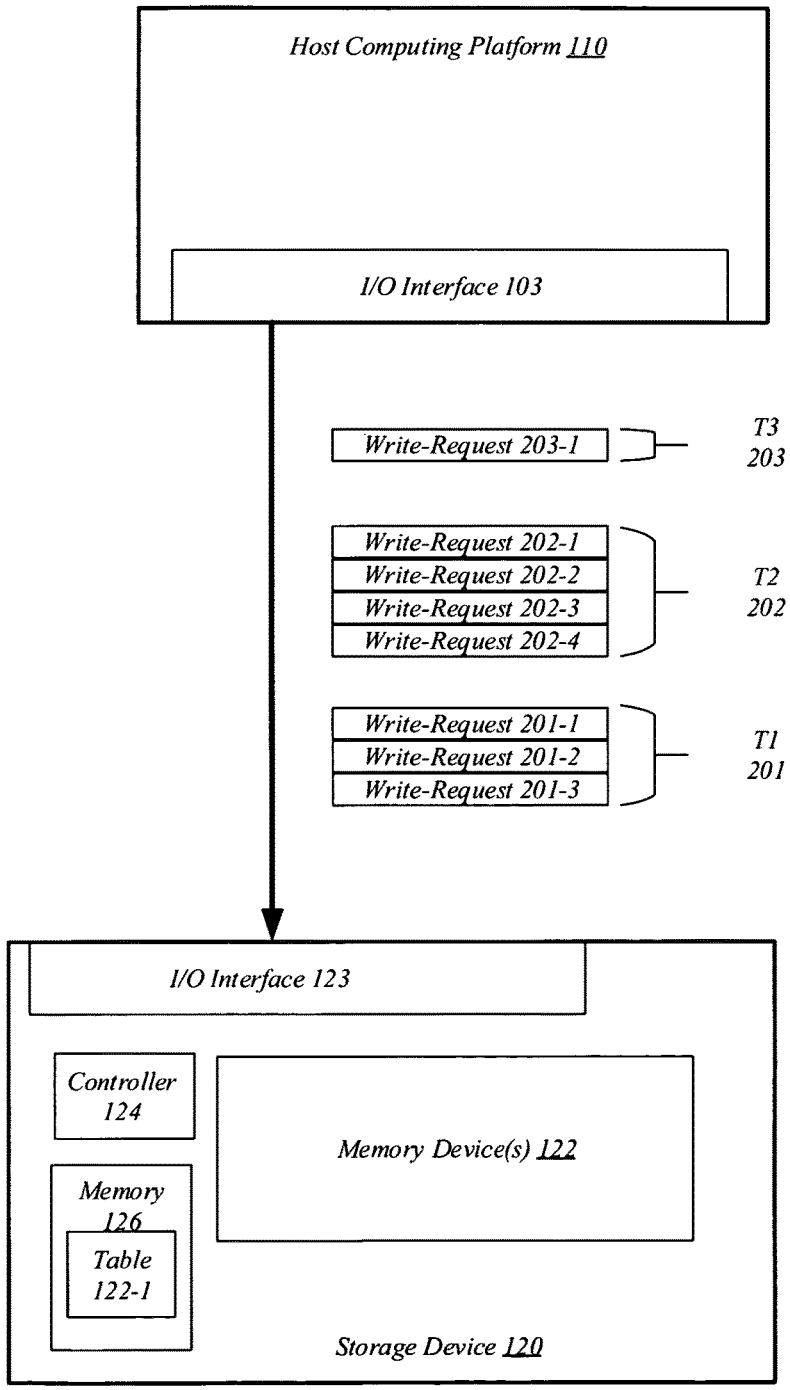
FIG. 2 illustrates an example second system.

FIG. 2 illustrates an example second system. As shown in FIG. 2, the example second system includes system 200. In some examples, system 200 includes elements from system 100 such as host computing platform 110 coupled with storage device 120 through I/O interfaces 103 and 123. Other elements from system 100 such as memory device(s) 122, controller 124, and memory 126 may also be included in system 200 as shown in FIG. 2.

In FIG. 2, the host computing platform 110 issues a number of transactions including write-request for data to be written to the storage device 120. Each transaction may be generated by an application including one or more write-request operations. For example, system 200 includes host computing platform 110 issuing or sending three (3) transactions T1 201, T2 202, and T3 203. Further, T1 201 has three write-requests 201-1 through 201-3, T2 202 has four write-requests 202-1 through 202-4, and T3 203 has a single write-request 203-1. Embodiments are not limited in this manner and system 200 may include any number of transactions, each having one or more write-requests.

Typically, when a host device issues a first transaction to a storage device, the first transaction will be communicated to a storage device via the storage bus using a storage protocol and the host device must ensure that the first transaction completes before sending a second transaction that is dependent on the completion of the first transaction. In some instances, a host device issues a host-to-device flush command, and only after receiving a complete command will the host device send another transaction. However, this scheme is slow and hurts storage performance. Thus, embodiments include techniques to offload a sequence of transactions including dependent transactions and independent transactions from the host computing platform 110 to the storage device 120. A dependent transaction may be any transaction having at least one write-request and one dependency from another transaction. Thus, the dependent transaction must wait for the transaction it depends upon, to commit before the dependent transaction is committed. An independent transaction may be any transaction having at least one write-request, but does not have any dependencies on other transaction.

In embodiments, the storage device 120 manages and controls the processing of the transactions and the host computing platform 110 does not have to wait for an individual transaction to complete before sending another transaction freeing up time to process other data. In example system 200, the host computing platform 110 issues or sends three transactions 201, 202, and 203 without waiting to receive an indication of completion of a host-to-device 'flush' command from the storage device 120. As will be discussed in more detail below, the host computing platform 110 also communicates commands associated with each of the transactions to notify the storage device 120 of the transactions and of any dependencies.

The storage device 120 may receive these transactions 201, 202, and 203 over a storage bus such as a non-volatile memory express (NVMe) bus attached through the peripheral component interconnect express (PCIe) bus, a small computer system interface (SCSI), a serial attached SCSI (SAS), serial AT attachment (SATA), and so forth. For example, the transaction 201, 202, and 203 may be communicated to the storage device 120 by the host computing platform 110 setting one or more registers associated with a PCIe bus coupled with the storage device 120. Embodiments are not limited in this manner and I/O registers associated with any type of bus may be set to communicate transactions.

The storage device 120 may process the transactions 201, 202, and 203 in parallel or simultaneously by writing data in two or more of them to memory device(s) 122 in parallel. However, the storage device 120 may not commit or update pointers in table 122-1 for the write-requests for dependent transactions that have dependencies on another transaction until all of the dependencies have been committed in the table 122-1. More specifically, a transaction may be committed once the pointers for the transaction's data are updated in the table 122-1. Once the transaction(s) upon which the dependent transaction depends are committed in the table 122-1, the dependent transaction's write-request(s) may be committed in table 122-1.

Figure 3A:
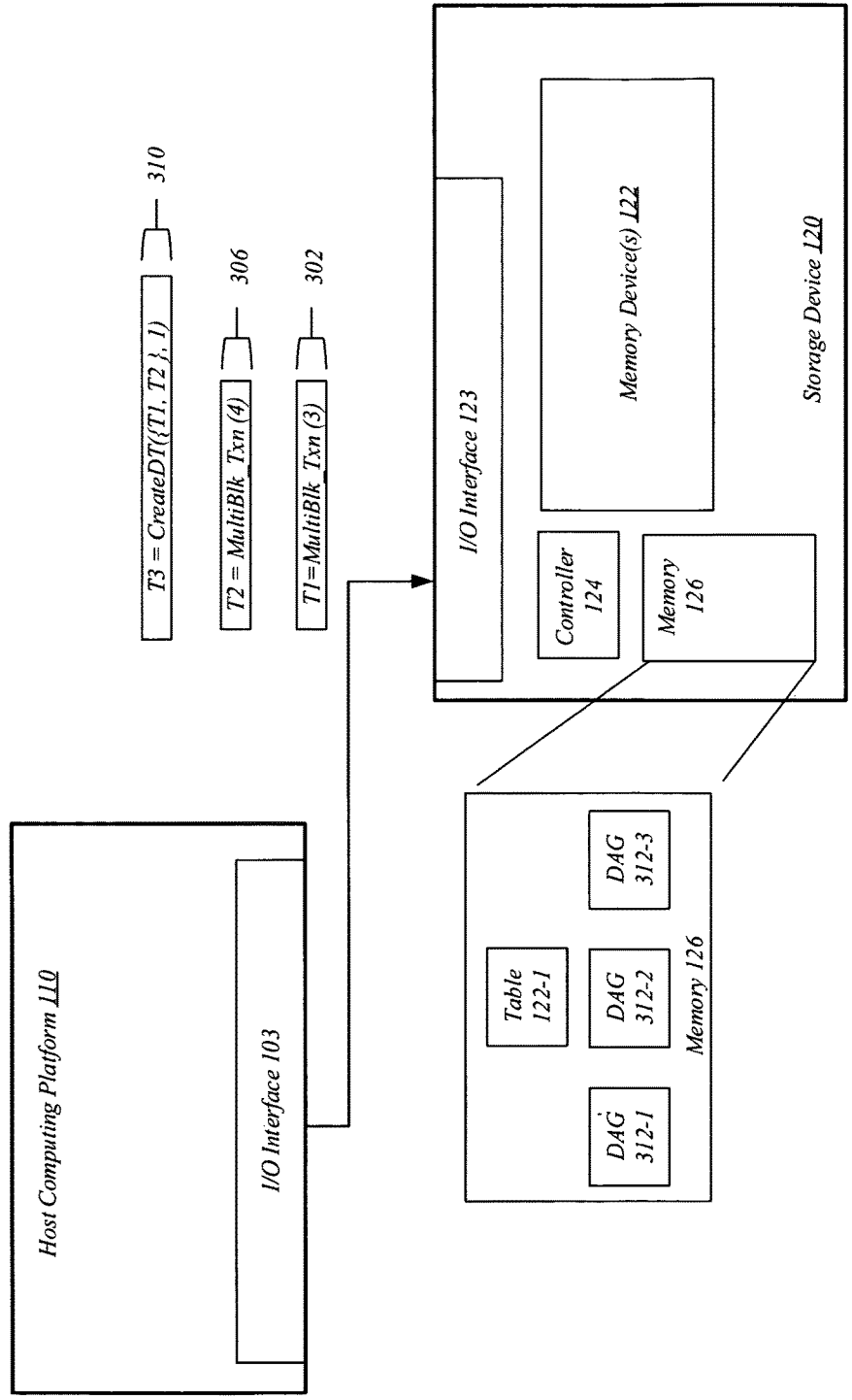
FIG. 3A illustrates an example third system.

FIG. 3A illustrates an example third system. As shown in FIG. 3A, the example second system includes system 300. In some examples, system 300 includes elements from systems 100 and 200 such as host computing platform 110 coupled with storage device 120 through I/O interfaces 103 and 123. Other elements from systems 100 and 200 such as memory device(s) 122, controller 124, and memory 126 may also be included in system 300 as shown in FIG. 3A.

As previously mentioned, the host computing platform 110 may issue a number of transactions each corresponding with commands. The commands are used to offload processing of the transactions from the host computing platform 110 to the storage device 120. For example, the commands may include information identifying the transaction, the type of transaction, a number of write-requests for the transaction, and identification of dependencies. In some embodiments, a different command type may be used or communicated for transactions that have dependencies versus those transactions that do not have any dependencies. For example, a "MultiBlk_Txn" command may be communicated for an independent transaction and a "CreateDT" command may be communicated for a dependent transaction.

In system 300, the host computing platform 110 communicates three commands to the storage device 120. More specifically, host computing platform 110 sends a first command 302 to generate and identify a first transaction (T1) using a "MultiBlk_Txn" command having a write-request parameter value indicating a number of write-requests for the transaction. In this example, the first command 302 may correspond with T1 201 illustrated in FIG. 2 and the write-request parameter value is three (3) indicating three (3) write-request operations for the transaction.

The host computing platform 110 communicates a second command 306 to generate and identify a second transaction (T2) using the "MultiBlk_Txn" command having a write-request parameter value of four (4) indicating the transaction T2 includes four (4) write-request operations in this example. The second command 306 may correspond with the T2 202 illustrated in FIG. 2. The host computing platform 110 sends a third command 310 to generate and identify a third transaction (T3) as a dependent transaction using the "CreateDT" command having a dependency parameter value that can have one or more tokens identifying dependencies or transactions that must be committed before T3 is committed. In some embodiments, the dependency parameter may include any number of dependencies or may be limited to a specific number of dependencies. Embodiments are not limited in this manner. In this example, T3 includes dependencies to T1 and T2, as indicated by the tokens in the third command 310 and has one write-request to write data to the memory device(s) 122. In embodiments, the commands, such as "MultiBlk_Txn," and "CreateDT," can be an application programming interface (API) calls made from the host computing platform 110 to the storage device 120. The calls may be translated to storage and control bus operations for communication to the storage device 120. However, embodiments are not limited in this manner and any command may be used to communicate information from the host computing platform 110 to the storage device 120 that can generate non-dependent and dependent transactions.

In embodiments, the controller 124 generates a DAG structure in memory 126 for each transaction based on the command to generate and identify a transaction. Thus, each transaction may be associated with a DAG structure for use by the controller 124 to determine whether to commit or not commit write-requests based on whether a transaction has any dependencies remaining to be committed. A DAG structure is a directed graph with no directed cycles. That is, it is formed by a collection of nodes and edges, each edge connecting one node to another, such that there is no way to start at particular node and follow a sequence of edges that eventually loops back to that same node.

A DAG is generally used to define relationships between nodes and forms a partial order. A collection of tasks, such as transactions, that must be ordered into a sequence, subject to constraints that certain tasks must be performed earlier than others, may be represented as a DAG. A node may represent a transaction and each edge may represent a constraint or dependency. In embodiments, algorithms for topological ordering may be used to generate a valid sequence for the transactions and dependencies, by the controller 124.

In embodiments, each transaction for processing is associated with a DAG in memory 126 which may be volatile memory. The DAG may include a node identifying the transaction and additional nodes representing other transactions that must be committed before the transaction can be committed. As mentioned, a node may be coupled with another node, via an edge which represents a dependency to that other node or transaction. In the illustrated embodiment, memory 126 stores three (3) DAG structures 312-1, 312-2, and 312-3, corresponding with each of the transactions received. More specifically, DAG 312-1 may correspond with T1 201, DAG 312-2 may correspond with the T2 202, and DAG 312-3 may correspond with the T3 203.

Figure 3B:
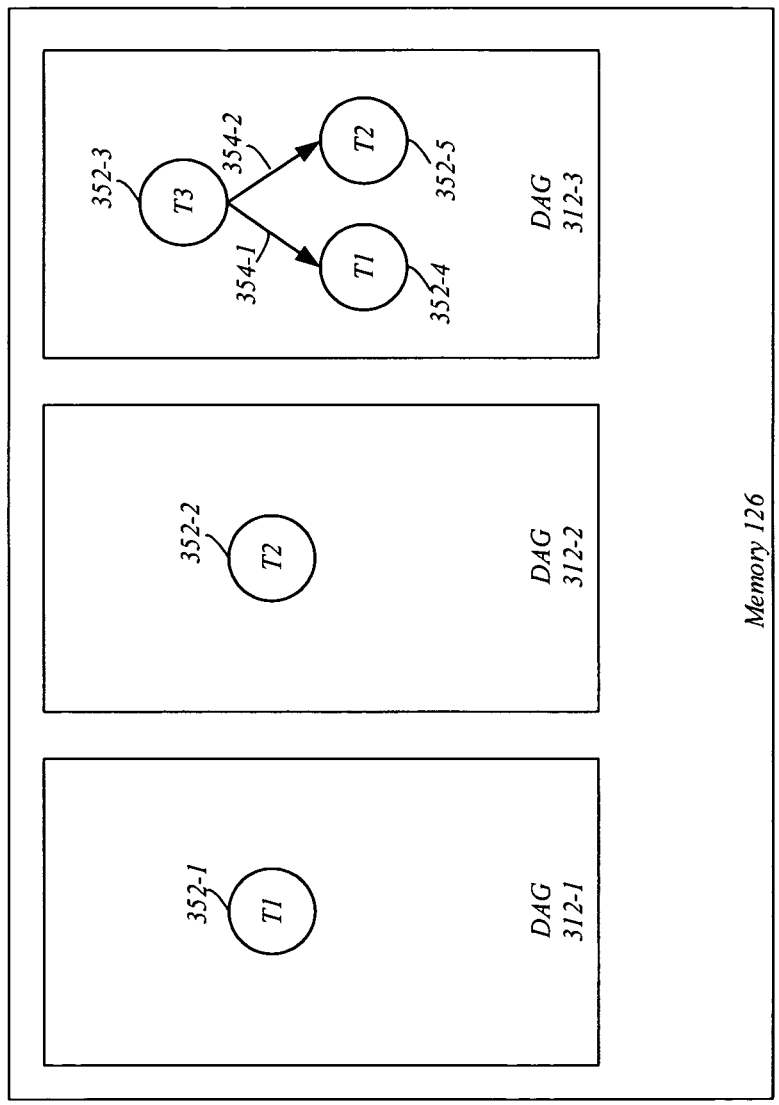
FIG. 3B illustrates an example memory.

FIG. 3B illustrates an example memory. As shown in FIG. 3B, the example memory includes memory 126 including a detailed view of DAGs 312-1, 312-2, and 312-3. The DAGs 312-1, 312-2, and 312-3 are generated by the controller 124 and have a number of nodes 352 corresponding to transactions. A DAG may also have edges 354 that represent dependencies to other nodes or transactions, as illustrated by DAG 312-3.

In embodiments, the controller 124 may receive the first command 302 and generate DAG 312-1 based on the information in the first command 302. The DAG 312-1 may correspond with transaction T1 201. Similarly, the controller 124 may receive the second command 306 and generate DAG 312-2 based on the information in the second command 306. The DAG 312-2 may correspond with transaction T2 202.

The controller 124 may generate DAG 312-3 based the information in the third command 310, which corresponds with T3 203. For example, FIG. 3B illustrates DAG 312-1 having a single node 352-1 which corresponds with transaction T1 201 itself. Similarly, DAG 312-2 includes node 352-2 which corresponds with transaction T2 202 itself. DAG 312-2 includes node 352-3 which corresponds with the dependent transaction T3 203 itself, and nodes 352-4 and 352-5 correspond with transactions T1 201 and T2 202 that must commit prior to the dependent transaction T3. Node 352-3 is coupled with node 352-4 via a first edge 354-1 and with node 352-5 via a second edge 354-2 indicating dependencies in the direction of the arrow. Thus, the transactions T1 201 and T2 202 associated with nodes 452-4 and 452-5, respectively, must be committed prior to transaction T3 203. In embodiments, the controller 124 may check a DAG structure associated with a transaction prior to committing the transaction to the memory device(s) 122 in table 122-1. If any dependencies are indicated in a DAG, the transaction will not be committed, but will be put into storage device device(s) 122.

In embodiments, each transaction may be processed using a breadth-first or a depth-first traversal. In embodiments, the transactions may be processed in an ordered sequence based on priority. For example, one or more transactions may be indicated as having a higher priority than another transaction. These transactions may be processed before the other transaction as long as no dependency requirements are broken. Embodiments are not limited in this manner.

Figure 4A:
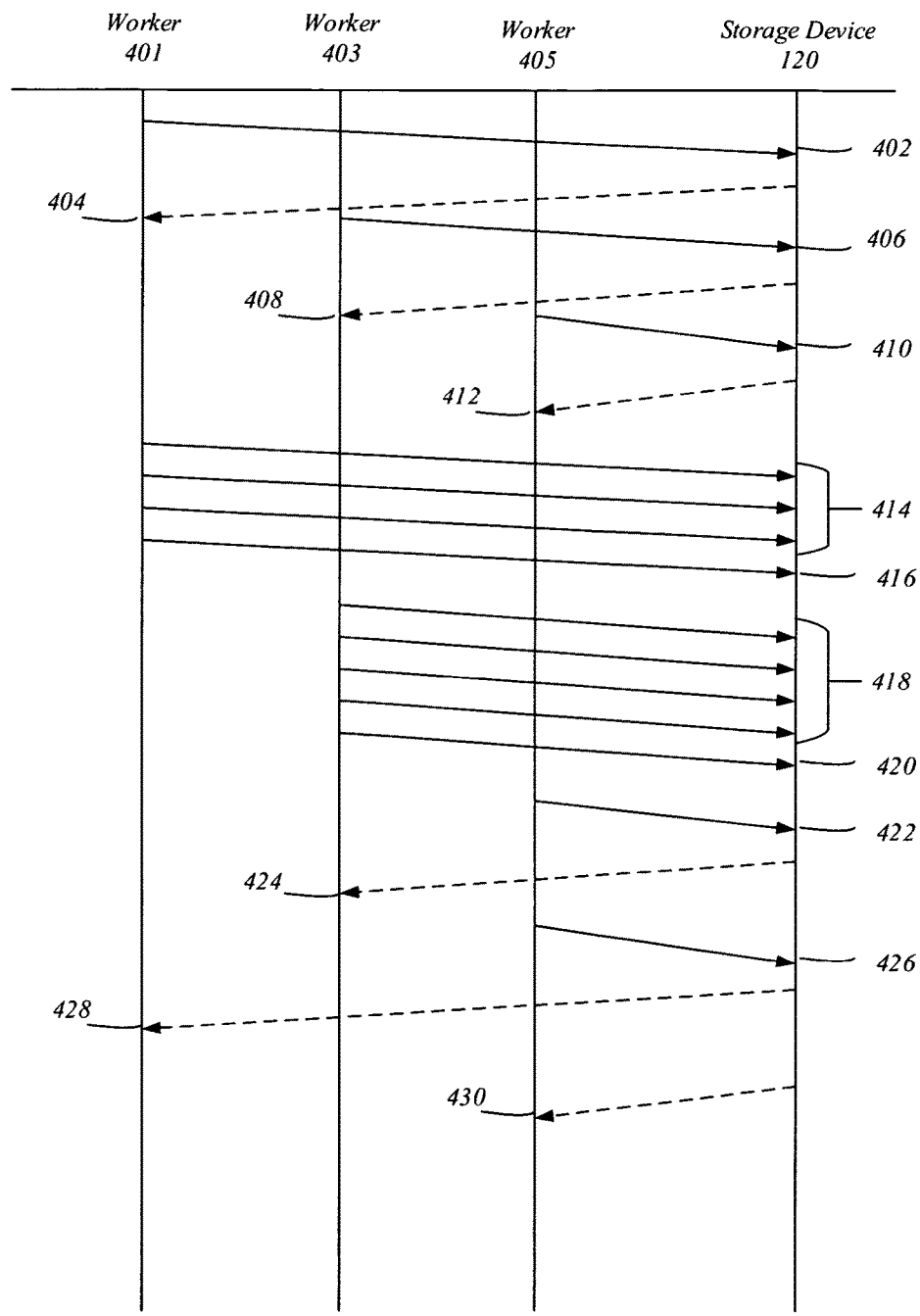
FIG. 4A illustrates an example sequence diagram.

FIG. 4A illustrates an example sequence diagram. As shown in FIG. 4A the sequence diagram includes sequence diagram 400 having a number of communications sent between workers 401, 403, and 405 and storage device 120. In embodiments, the workers 401, 403, and 405 may be one or more processes operating on the host computing platform 110 used to communicate data to storage device 120 for storage. In embodiments, the workers 401, 403, and 405 may receive commands and direction from host computing platform 110 including circuitry and the storage device driver 115 to communicate information to the storage device 120. However, embodiments are not limited in this manner.

Further, FIG. 4B illustrates an example table diagram 450 having a host computing platform table 460 and a storage device table 470, each having communications sent between the host computing platform 110 and the storage device 120 discussed in FIG. 4A. Each communication in the tables 460 and 470 are identified by their respective line identifiers in sequence diagram 400. Thus, FIG. 4B may be used as a reference for sequence diagram 400. The sequence diagram 400 and table diagram 450 illustrate one possible communication exchange based on previous examples. Embodiments are not limited in this manner.

Sequence diagram 400 is an example diagram based on the example systems 100, 200, and 300 previously discussed, and the messages communicated in those systems. For example, at line 402, the worker 401 communicates a command "T1=MultiBlk_Txn(3)" to the storage device 120 to generate and identify a first command for storage. At line 304, the storage device 120 communicates a response or acknowledgement command "Ack(T1)" to the first worker 401 to acknowledge receipt of command. At lines 406 and 408 a similar exchange may occur between worker 403 and the storage device 120. At line 406 "T2=MultiBlk(4)" may be communicated between worker 403 and storage device 120 and at line 408, "Ack(T2)" may be communicated between worker 403 and storage device 120. Similarly, at line 410, "T3=CreateDT({T1, T2}, 1)" may be communicated to storage device 120, and at line 412 a response "Ack(T3)" is communicated to worker 405.

At lines 414, a number of communications or commands for the transaction T1 are communicated from worker 401 to the storage device 120. Each command represents a write-request and the number communicated was previously disclosed in the corresponding command at line 402. More specifically, at lines 414 three write-request operations are communicated to the storage device 120. Each write-request may be in the format of "AsyncWrite (Transaction identifier, Logic Block Address (LBA), Length, Data)" as illustrated in table diagram 450. The transaction identifier identifies the transaction for the AsyncWrite, the LBA is the logical block address for the data, the length is the length or amount of data, and data is the data itself. Further, at line 416 the worker 401 may communicate a "Commit (T1)" command to the storage device 120 indicating the end of the first transaction T1.

At lines 418, a number of communications or commands for the transaction T2 are communicated from worker 403 to the storage device 120. Each command represents a write-request, as previously discussed. More specifically, at lines 418 four write-request operations are communicated to the storage device 120 to communicate data. At line 420, the worker 403 may communicate a "Commit (T2)" command to the storage device 120 indicating the end of the second transaction T2.

At line 422, the worker 405 communicates a command for the transaction T3 representing a write-request to store data in the storage device 120. While the workers 401, 403, and 405 and storage device 120 are communicating information, the controller 124 of the storage device 120 may be processing the received information. For example, the controller 124 may process data for a transaction in memory device 122 and determine whether the data may be committed based on information in a DAG generated for transaction. At line 424, the storage device 120 may communicate a "Commit_Complete(T2)" command to the worker 403 indicating that transaction T2 has been committed to memory device 122. At line 426, the storage device 120 may receive a "Commit (T3)" command indicating the end of the third transaction T3.

At line 428, the storage device 120 may communicate a "Commit_Complete(T1)" command to the worker 401 indicating that transactionT1 has been committed to memory device 122. Similarly, at line 430 may communicate a "Commit_Complete(T3)" command or command to the worker 405 indicating that transaction T3 has been committed to memory device 122. As previously mentioned, the third transaction T3 is dependent on the first and second transaction T1 and T2, and therefore, the controller 124 must wait until T1 and T2 are committed before T3 is committed. Thus, the controller 124 may use a DAG, such as DAG 312-3, to determine whether dependencies still exist for T3. Once, DAG 312-3 indicates that T1 and T2 have been committed, then T3 may be committed to the memory device 122 by the controller 124.

Figure 5:
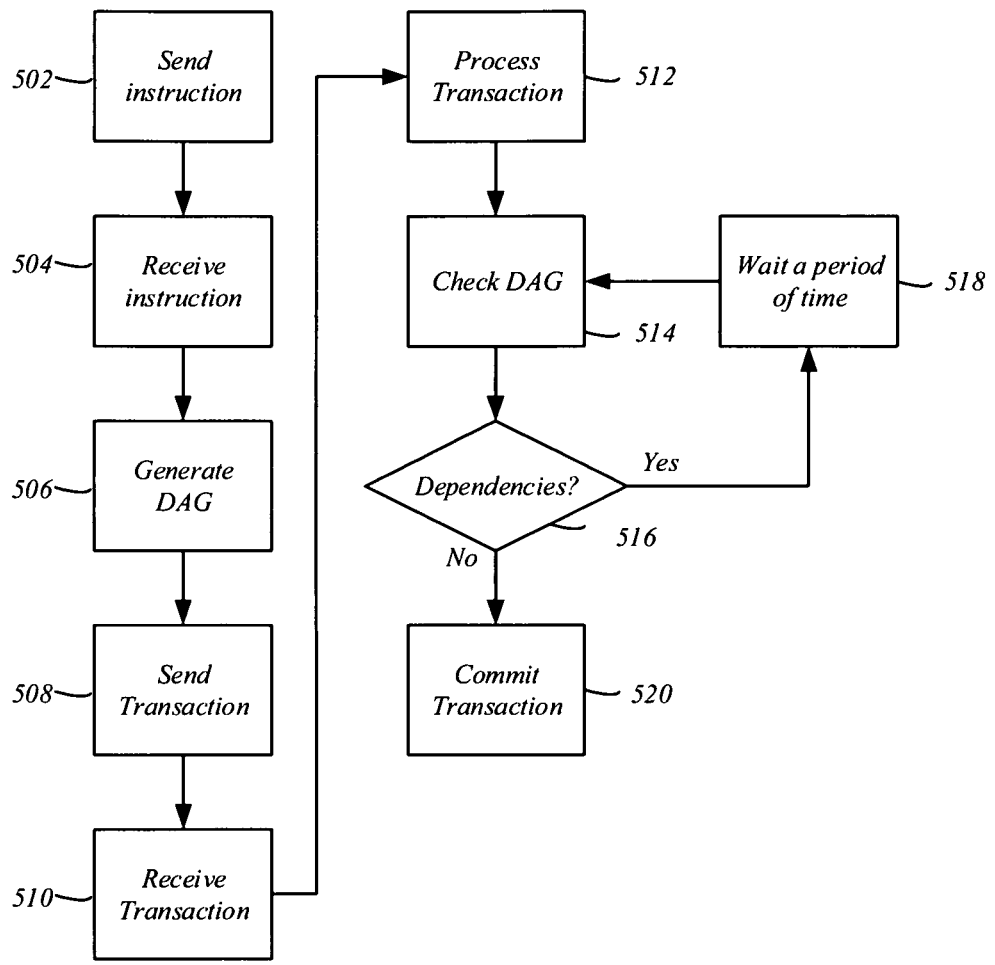
FIG. 5 illustrates an example logic flow.

FIG. 5 illustrates an example logic flow. As shown in FIG. 5 the logic flow includes logic flow 500 having a number of blocks which may be performed by the systems discussed herein. More specifically, logic flow 500 may be performed by one or more elements of systems 100, 200 and 300. However, embodiments are not limited in this manner.

At blocks 502 and 504, a command may be communicated by a host computing platform 110 and received by a storage device 120. For example, the host computing platform 110, via the storage device driver 115, may cause a command to be sent to the storage device 120 via interfaces 103 and 123. In embodiments, the command generates a non-dependent or a dependent transaction, and includes information indicating a number of write-request operations for the transaction. If the transaction is a dependent transaction, the command may include information identifying the transaction from which the dependent transaction has dependencies. For example, the command may include on or more tokens identifying dependency transactions or pre-requisite transactions that are to be committed prior to the dependent transactions.

At block 506, a DAG may be generated based on the command for a transaction. For example, the controller 124 may generate a DAG having at least one node, and if the transaction is a dependent transaction, one or more edges indicating dependencies. The DAG may be a graph data structure stored in memory, such as memory 126, for use in determining whether a transaction should be committed to the memory or not. More specifically, if dependencies still exist for the transaction, the transaction will not be committed to memory in table 122-1, but will be copied or written to memory device 122. Only when no dependencies exist will a transaction be committed in table 122-1.

At blocks 508 and 510, the transaction may be sent by a host computing platform 110 and received by a storage device 120. The transaction may include a number of write-request operations to copy data into the memory device(s) 122. Each write-request operation may be an AsyncWrite command including information identifying the transaction, the LBA for the data, a length for the data, and the data, as previously discussed. However, embodiments are not limited in this manner and the write-request operation may be any type of write command to write data into a storage device.

At block 512, the transaction may be processed. In some embodiments, the transaction may be copied by the controller 124 to the memory device 122 for storage. Moreover, the transaction may be processed in parallel or in semi-simultaneous manner with other transactions that are communicated to the storage device 120. However, the transaction may not be committed in a mapping table until all other dependency transaction have been committed. In these instances, the mapping may be stored temporarily in memory 126 until the transaction may be committed.

In embodiments, dependencies may be checked based on a DAG associated with the transaction. For example, the controller 124 may check a DAG stored in memory 126 associated with the transaction to determine whether the transaction has any dependencies that need to be committed. If dependencies do exist at decision block 516, a timer may be invoked at block 518 to wait a period of time and then the DAG may be checked again at block 514. This process may be repeated until the transaction does not have any dependencies. In some embodiments, instead of waiting for a period of time, the controller 124 may perform the dependency check automatically whenever a first transaction completes to see if a second transaction that was waiting for the first transaction to complete has any further dependencies. In one embodiment a combination of waiting for a finite amount of time or waiting for the next transaction to complete may be used. Embodiments are not limited in this manner.

At block 520, the transaction may be committed to the memory device 122. More specifically, mapping information may be inserted into table 122-1 to map the information to the memory device 122. In some instances, the mapping information may be copied to the table 122-1 in the memory 126 from the memory device 122 or from a temporary location in the memory 126. However, embodiments are not limited in this manner. Each transaction may be processed similar to the logic flow described above in FIG. 5. As previously mentioned, a number of transaction may be communicated from a host computing platform 110 to a storage device 120 for processing. The storage device 120 may coordinate processing of each of these transaction such that transactions having dependencies are not committee until their 'parent' transactions (i.e., transactions upon whom they depend) are committed. By having the storage device 120 process the transactions in this manner, the host computing platform 110 may be freed to process other information and is not waiting for a flush command from the storage device 120.

Figure 6:
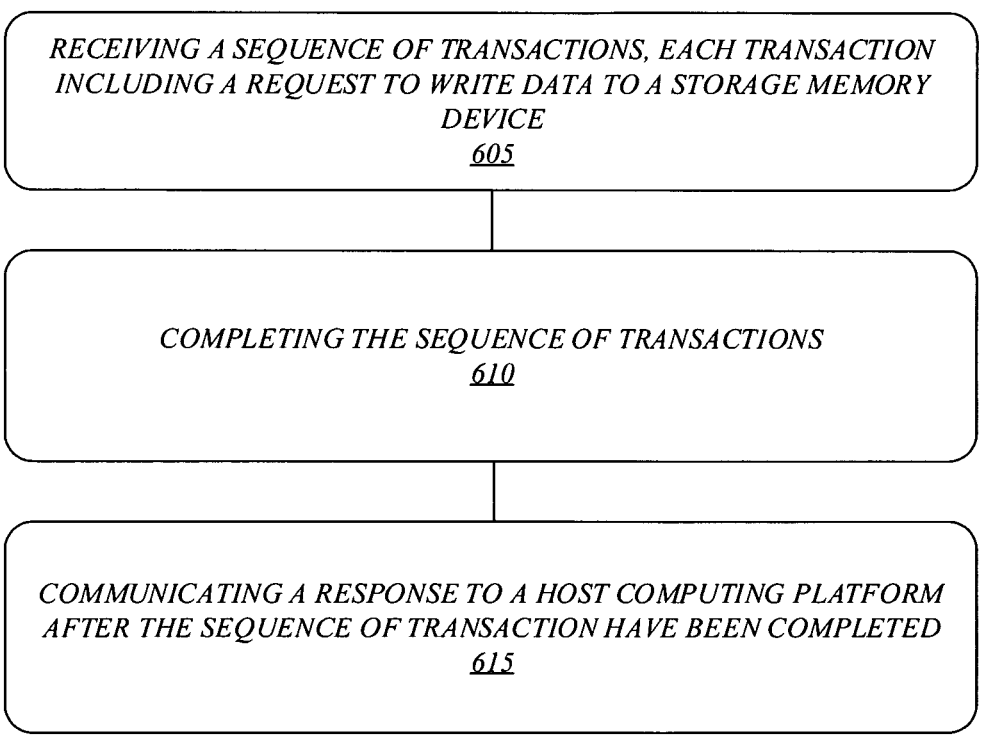
FIG. 6 illustrates an example second logic flow.

FIG. 6 illustrates an example second logic flow. As shown in FIG. 6 the logic flow includes logic flow 600 which may be performed by one or more elements of systems 100, 200 and 300. However, embodiments are not limited in this manner.

The logic flow 600 includes receiving a sequence of transactions, each transaction including a request to write data to a memory device at block 605. In embodiments, the sequence of transaction may be communicated as a series of commands, each command may identify a transaction and whether the transaction is an independent transaction or a dependent transaction having one or more dependencies. If the transaction is a dependent transaction, a command may include information identifying one or more dependencies or one or more other transactions upon which the transaction depends. Further, each transaction may correspond with one or more write requests to write data in a storage device which may be communicated as write request commands.

The logic flow 600 may also include completing the sequence of transactions at block 610. The sequence of transactions may be considered complete when all of the transactions in the sequence have been written to a memory device and mapping of the data is committed in a table. Further and at block 615, the logic flow 600 may include communicating a response to a host computing platform after the sequence of transaction have been completed.

FIG. 7 illustrates an example of a first storage medium. As shown in FIG. 7, the first storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flows 500 and 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
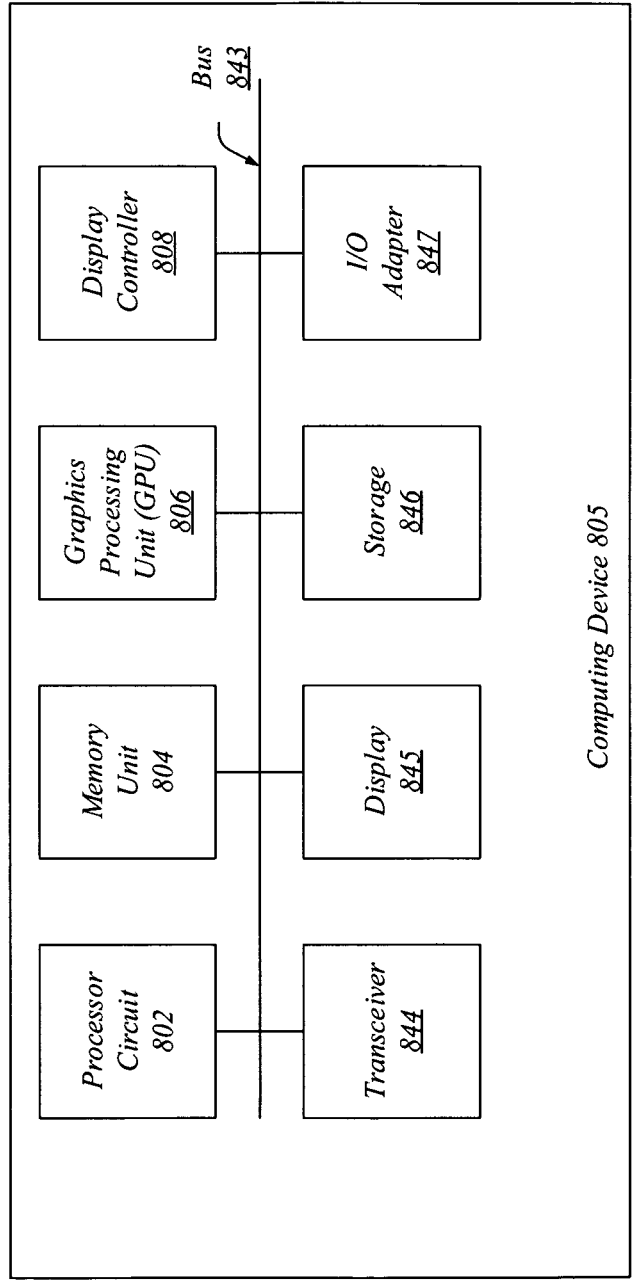
FIG. 8 illustrates an example system.

FIG. 8 illustrates one embodiment of a system 800. In various embodiments, system 800 may be representative of a system or architecture suitable for use with one or more embodiments described herein. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a computing device 805 which may be any type of computer or processing device including a personal computer, desktop computer, tablet computer, netbook computer, notebook computer, laptop computer, server, server farm, blade server, or any other type of server, and so forth.

In various embodiments, computing device 805 may include processor circuit 802. Processor circuit 802 may be implemented using any processor or logic device. The processing circuit 802 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 802 may be connected to and communicate with the other elements of the computing system via an interconnect 843, such as one or more buses, control lines, and data lines.

In one embodiment, computing device 805 may include a memory unit 804 to couple to processor circuit 802. Memory unit 804 may be coupled to processor circuit 802 via communications bus 843, or by a dedicated communications bus between processor circuit 802 and memory unit 804, as desired for a given implementation. Memory unit 804 may be implemented using any machine-readable or computer-readable media capable of storing data, including both volatile and non-volatile memory. In some embodiments, the machine-readable or computer-readable medium may include a non-transitory medium. The embodiments are not limited in this context. In some embodiments, memory 108 may be the same as memory unit 804.

Computing device 805 may include a graphics processing unit (GPU) 806, in various embodiments. The GPU 806 may include any processing unit, logic or circuitry optimized to perform graphics-related operations as well as the video decoder engines and the frame correlation engines. The GPU 806 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 806 may process any type of graphics data such as pictures, videos, programs, animation, 3D, 2D, objects images and so forth.

In some embodiments, computing device 805 may include a display controller 808. Display controller 808 may be any type of processor, controller, circuit, logic, and so forth for processing graphics information and displaying the graphics information. The display controller 808 may receive or retrieve graphics information from one or more buffers. After processing the information, the display controller 808 may send the graphics information to a display.

In various embodiments, system 800 may include a transceiver 844. Transceiver 844 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. It may also include a transceiver for wired networking which may include (but are not limited to) Ethernet, Packet Optical Networks, (data center) network fabric, etc. In communicating across such networks, transceiver 844 may operate in accordance with one or more applicable standards in any version. The embodiments are not limited in this context.

In various embodiments, computing device 805 may include a display 845. Display 845 may constitute any display device capable of displaying information received from processor circuit 802, graphics processing unit 806 and display controller 808.

In various embodiments, computing device 805 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 805 may include one or more I/O adapters 847. Examples of I/O adapters 847 may include Universal Serial Bus (USB) ports/adapters, IEEE 1394 Firewire ports/adapters, and so forth. The embodiments are not limited in this context.

Figure 9:
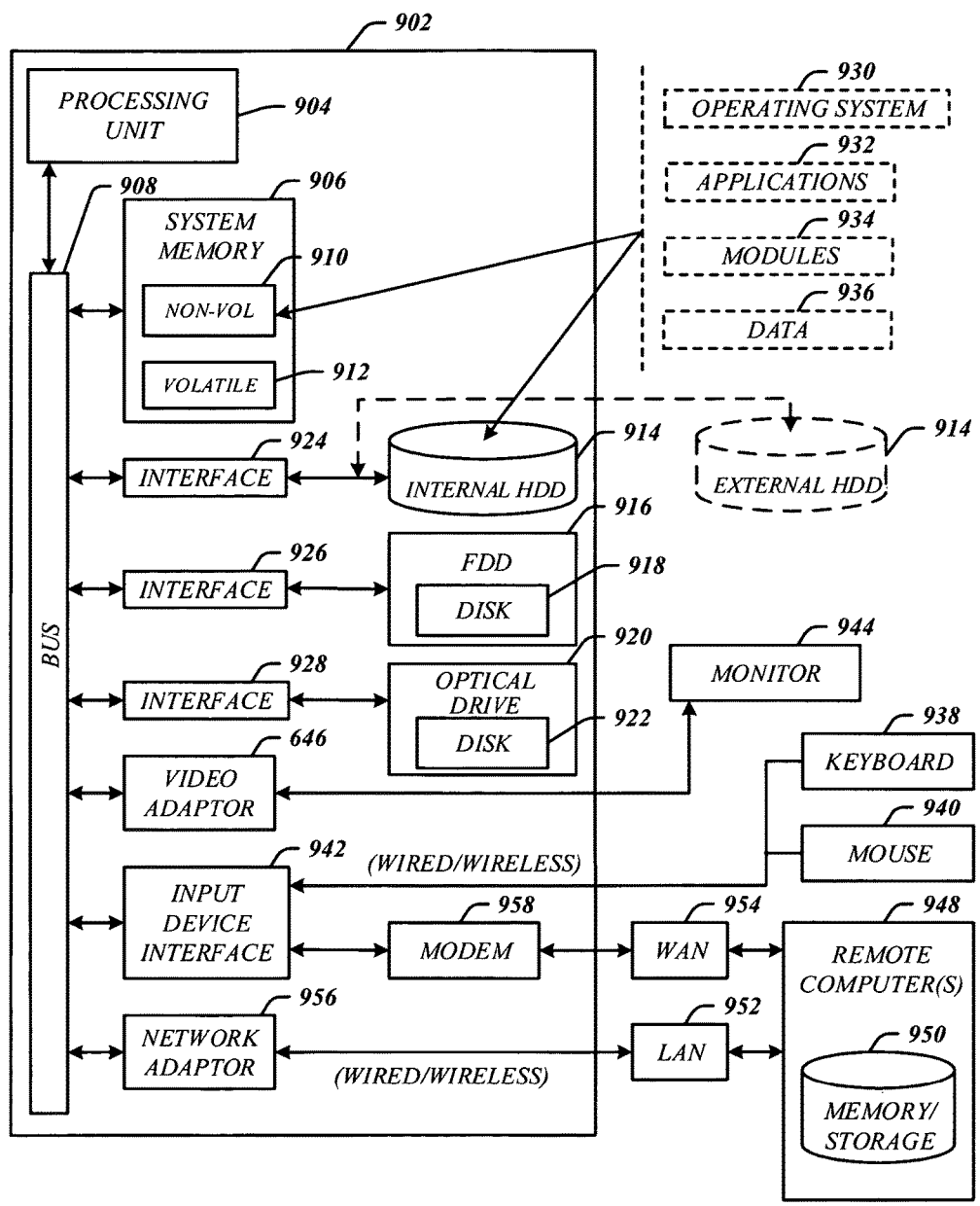
FIG. 9 illustrates an example computing architecture.

FIG. 9 illustrates an embodiment of an exemplary computing architecture 900 suitable for implementing various embodiments as previously described. In one embodiment, the computing architecture 900 may comprise or be implemented as part of system 100 and computing device 105.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, such as those described with reference to the processor component 102 shown in FIG. 1.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable, instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 105.

A user can enter commands and information into the computer 902 through one or more wired/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wired and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computing system 101 and 200 as previously described with reference to FIGS. 1-8 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, apparatus may include the controller to process a dependent transaction and another transaction from the sequence of transactions in parallel by writing data for the dependent transaction and the other transaction to a memory device, and commit the other transaction prior to committing the dependent transaction, the sequence of transaction completed when all transaction in the sequence have been committed.

In a second example and in furtherance of the first example, a system, device, apparatus may include the controller to process the dependent transaction and another transaction in parallel by copying data for the dependent transaction and the other transaction into one or more memory devices, and commit the other transaction prior to committing the dependent transaction.

In a third example and in furtherance of any previous example, a system, device, apparatus may include the dependent transaction having a plurality of dependencies from other transactions from the sequence of transaction, each of the other transactions corresponding with a different node of a directed-acyclic-graph (DAG) structure and each of the dependencies corresponding with a different edge of the DAG structure.

In a fourth example and in furtherance of any previous example, a system, device, apparatus may include the controller to process the dependent transaction and at least one other transaction in parallel by writing data to the memory device, and commit the dependent transaction after each of the other transactions has been committed.

In a fifth example and in furtherance of any previous example, a system, device, apparatus may include the controller to determine whether a directed-acyclic-graph (DAG) structure indicates any dependencies exist for a transaction in the sequence of transactions that have not been committed, committing the transaction if the DAG structure indicates no dependencies exist, and withhold committing the transaction if the DAG structure indicates dependencies exist.

In a sixth example and in furtherance of any previous example, a system, device, apparatus may include the controller to process the sequence of transactions based on priorities and use a traversal technique comprising one of a breadth-first traversal and a depth-first traversal.

In a seventh example and in furtherance of any previous example, a system, device, apparatus may include the controller to receive a command for a dependent transaction in the sequence of transactions, the command to indicate dependencies and a number of requests to write data for the dependent transaction.

In an eighth example and in furtherance of any previous example, a system, device, apparatus may include the command comprising a first parameter having one or more tokens to identify pre-requisite transactions for the dependent transaction and a second parameter having a number value to indicate the number of requests for the dependent transaction.

In a ninth example and in furtherance of any previous example, a system, device, apparatus may include a storage device comprising the internal memory, the controller, and one or more memory devices and an interface capable of communicating commands and transactions with a host computing platform.

In a tenth example and in furtherance of any previous example, a method may include receiving a sequence of transactions, each transaction including a request to write data to a memory devices, completing the sequence of transactions and communicating a response to a host computing platform after the sequence of transaction have been completed.

In an eleventh example and in furtherance of any previous example, a method may include processing a dependent transaction and another transaction from the sequence of transactions in parallel by writing data for the dependent transaction and the other transaction to one or more memory devices and committing the other transaction prior to committing the dependent transaction, in the sequence of transactions completed when all transactions have been committed.

In a twelfth example and in furtherance of any previous example, a method may include the dependent transaction having a plurality of dependencies from other transactions from the sequence of transaction, each of the other transactions corresponding with a different node of a directed-acyclic-graph (DAG) structure and each of the dependencies corresponding with a different edge in the DAG structure.

In a thirteenth example and in furtherance of any previous example, a method may include processing the dependent transaction and at least one other transaction in parallel by copying data to one or more memory devices and committing the dependent transaction after each of the other transactions have been committed.

In a fourteenth example and in furtherance of any previous example, a method may include determining whether a directed-acyclic-graph (DAG) structure indicates any dependencies exist that have not been committed for a transaction, committing the transaction if the DAG structure indicates no dependencies exist, and withholding committing the transaction if the DAG structure indicates dependencies exist.

In a fifteenth example and in furtherance of any previous example, a method may include processing the sequence of transactions based on priorities and use a traversal technique comprising one of a breadth-first traversal and a depth-first traversal.

In a sixteenth example and in furtherance of any previous example, a method may include receiving a command for a dependent transaction in the sequence of transactions, the command to indicate dependencies and a number of requests to write data for the dependent transaction.

In a seventeenth example and in furtherance of any previous example, a method may include the command comprising a first parameter having one or more tokens to identify pre-requisite transactions for the dependent transaction and a second parameter having a number value to indicate the number of requests for the dependent transaction.

In an eighteenth example and in furtherance of any previous example, an apparatus, device or system may include a host computing platform, a memory capable of storing a sequence of transactions, each transaction including a request to write data to a memory device, and a controller operatively coupled with the memory, the controller to complete the sequence of transactions and to send a response to the computing platform after the sequence of transactions have been completed.

In a nineteenth example and in furtherance of any previous example, an apparatus, device or system the controller to process a dependent transaction and another transaction from the sequence of transactions in parallel by writing data for the dependent transaction and the other transaction to a memory device, and commit the other transaction prior to committing the dependent transaction, the sequence of transactions completed when all transactions in the sequence have been committed.

In a twentieth example and in furtherance of any previous example, an apparatus, device or system may include the dependent transaction having a plurality of dependencies from other transactions from the sequence of transaction, each of the other transactions corresponding with a different node of a directed-acyclic-graph (DAG) structure and each of the dependencies corresponding with a different edge of the DAG structure.

In a twenty-first example and in furtherance of any previous example, an apparatus, device or system may include the controller to process the dependent transaction and at least one other transaction in parallel by writing data to the memory device, and commit the dependent transaction after each of the other transactions has been committed.

In a twenty-second example and in furtherance of any previous example, an apparatus, device or system may include the controller to determine whether a directed-acyclic-graph (DAG) structure indicates any dependencies exist for a transaction in the sequence of transactions that have not been committed, committing the transaction if the DAG structure indicates no dependencies exist, and withhold committing the transaction if the DAG structure indicates dependencies exist.

In a twenty-third example and in furtherance of any previous example, an apparatus, device or system may include the controller to process the sequence of transactions based on priorities and use a traversal technique comprising one of a breadth-first traversal and a depth-first traversal.

In a twenty-fourth example and in furtherance of any previous example, an apparatus, device or system may include the controller to receive a command for a dependent transaction in the sequence of transactions, the command to indicate dependencies and a number of requests to write data for the dependent transaction.

In a twenty-fifth example and in furtherance of any previous example, an apparatus, device or system may include the command comprising a first parameter having one or more tokens to identify pre-requisite transactions for the dependent transaction and a second parameter having a number value to indicate the number of requests for the dependent transaction.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a memory capable of storing a sequence of transactions, each transaction including a request to write data to a memory device of the memory; and
a controller comprising circuitry operatively coupled with the memory, the controller to receive a command for a dependent transaction in the sequence of transactions, the command to indicate dependencies and a number of requests to write data for the dependent transaction, the command comprising a first parameter having one or more tokens to identify pre-requisite transactions for the dependent transaction and a second parameter having a number value to indicate the number of requests for the dependent transaction, the controller to create, in response to receipt of the sequence of transactions from a host computing platform, a directed-acyclic-graph (DAG) structure for each of the transactions of the sequence of transactions, a DAG structure for a dependent transaction of the sequence of transactions that is dependent on another transaction of the sequence of transactions, to comprise an edge for the other transaction; the controller to determine, based on the DAG for the dependent transaction, whether a dependency on the other transaction is committed; the controller to complete the sequence of transactions and to send a response to the host computing platform after the dependency on the other transaction is committed and completion of the sequence of transactions.

2. The apparatus of claim 1, the controller to process the dependent transaction and the other transaction from the sequence of transactions in parallel by writing data for the dependent transaction and the other transaction to the memory device, and commit the other transaction prior to committing the dependent transaction, the sequence of transactions completed when all transactions in the sequence of transactions have been committed.

3. The apparatus of claim 2, the dependent transaction having a plurality of dependencies from additional transactions from the sequence of transactions, each of the additional transactions corresponding with a different node of the DAG structure for the dependent transaction and each of the dependencies corresponding with a different edge of the DAG structure for the dependent transaction.

4. The apparatus of claim 3, the controller to process the dependent transaction and at least one of the additional transactions in parallel by writing data to the memory device, and to commit the dependent transaction after each of the additional transactions has been committed.

5. The apparatus of claim 1, the controller to determine whether the DAG structure for the dependent transaction indicates any dependencies exist for a transaction in the sequence of transactions that have not been committed, committing the transaction if the DAG structure indicates no dependencies exist, and withhold committing the transaction if the DAG structure indicates dependencies exist.

6. The apparatus of claim 1, the controller to process the sequence of transactions based on priorities and use a traversal technique comprising one of a breadth-first traversal and a depth-first traversal.

7. The apparatus of claim 1, comprising:
a storage device comprising the memory, the controller, one or more memory devices, and an interface capable of communicating commands and transactions with the host computing platform.

8. A computer-implemented method, comprising:
receiving, at an interface of an apparatus from a host computing platform, a sequence of transactions, each transaction including a request to write data to a memory device;
receiving, by a controller, a command for a dependent transaction in the sequence of transactions, the command to indicate dependencies and a number of requests to write data for the dependent transaction, the command comprising a first parameter having one or more tokens to identify pre-requisite transactions for the dependent transaction and a second parameter having a number value to indicate the number of requests for the dependent transaction;
creating, by the controller, based on receipt of the sequence of transactions, a directed-acyclic-graph (DAG) structure for each of the transactions of the sequence of transactions, a DAG structure for the dependent transaction of the sequence of transactions that is dependent on another transaction of the sequence of transactions, to comprise an edge for the other transaction,
determining, by a controller, based on the DAG for the dependent transaction, whether a dependency on the other transaction is committed,
completing the sequence of transactions; and
communicating a response to the host computing platform after the dependency on the other transaction is committed and completion of the sequence of transactions.

9. The computer-implemented method of claim 8, comprising:
processing the dependent transaction and the other transaction from the sequence of transactions in parallel by writing data for the dependent transaction and the other transaction to the memory device; and
committing the other transaction prior to committing the dependent transaction, the sequence of transactions completed when all transactions in the sequence of transactions have been committed.

10. The computer-implemented method of claim 9, the dependent transaction having a plurality of dependencies from additional transactions from the sequence of transactions, each of the other transactions corresponding with a different node of the DAG structure for the dependent transaction and each of the dependencies corresponding with a different edge in the DAG structure for the dependent transaction.

11. The computer-implemented method of claim 10, comprising:
processing the dependent transaction and at least one of the additional transactions in parallel by copying data to the memory device; and
committing the dependent transaction after each of the additional transactions have been committed.

12. The computer-implemented method of claim 8, comprising:
determining whether the DAG structure for the dependent transaction indicates any dependencies exist that have not been committed for a transaction;
committing the transaction if the DAG structure for the dependent transaction indicates no dependencies exist; and
withholding committing the transaction if the DAG structure for the dependent transaction indicates dependencies exist.

13. The computer-implemented method of claim 8, comprising:
processing the sequence of transactions based on priorities and using a traversal technique comprising one of a breadth-first traversal and a depth-first traversal.

14. A system, comprising:
a host computing platform; and
a storage device coupled with the host computing platform, the storage device comprising a memory, a controller, one or more memory devices, and an interface capable of communicating with the host computing platform,
the memory capable of storing a sequence of transactions, each transaction including a request to write data to a memory device; and
the controller operatively coupled with the memory, the controller to receive a command for a dependent transaction in the sequence of transactions, the command to indicate dependencies and a number of requests to write data for the dependent transaction, the command comprising a first parameter having one or more tokens to identify pre-requisite transactions for the dependent transaction and a second parameter having a number value to indicate the number of requests for the dependent transaction, the controller to create, in response to receipt of the sequence of transaction from a host computing platform, a directed-acyclic-graph (DAG) structure for each of the transactions of the sequence of transactions, a DAG structure for a dependent transaction of the sequence of transactions that is dependent on another transaction of the sequence of transactions, to comprise an edge for the other transaction, the controller to check the DAG for the dependent transaction to determine whether a dependency on the other transaction is committed, the controller to complete the sequence of transactions and to send a response to the host computing platform after the dependency on the other transaction is committed and completion of the sequence of transactions.

15. The system of claim 14, the controller to process the dependent transaction and the other transaction from the sequence of transactions in parallel by writing data for the dependent transaction and the other transaction to the memory device, and commit the other transaction prior to committing the dependent transaction, the sequence of transactions completed when all transactions in the sequence of transactions have been committed.

16. The system of claim 14, the dependent transaction having a plurality of dependencies from other transactions from the sequence of transaction, each of the other transactions corresponding with a different node of the DAG structure for the dependent transaction and each of the dependencies corresponding with a different edge of the DAG structure for the dependent transaction.

17. The system of claim 16, the controller to process the dependent transaction and at least one other transaction in parallel by writing data to the memory device, and commit the dependent transaction after each of the other transactions has been committed.

18. The system of claim 14, the controller to determine whether the DAG structure for the dependent transaction indicates any dependencies exist for a transaction in the sequence of transactions that have not been committed, committing the transaction if the DAG structure for the dependent transaction indicates no dependencies exist, and withhold committing the transaction if the DAG structure for the dependent transaction indicates dependencies exist.

19. The system of claim 14, the controller to process the sequence of transactions based on priorities and use a traversal technique comprising one of a breadth-first traversal and a depth-first traversal.

* * * * *